United States Patent [19]

Moulin

[11] 4,328,071

[45] May 4, 1982

[54] DEVICE FOR GUIDING DUCTS WHICH EXTEND THROUGH A ROTATABLE COMPONENT

[75] Inventor: Maurice Moulin, Palaiseau, France

[73] Assignee: Commissariat a l'Energie Atomique, Paris, France

[21] Appl. No.: 112,931

[22] Filed: Jan. 17, 1980

[30] Foreign Application Priority Data

Jan. 18, 1979 [FR] France ............................ 79 01264

[51] Int. Cl.³ ............................................ G21C 19/20
[52] U.S. Cl. ................................ 376/245; 294/86 A; 414/146; 376/460
[58] Field of Search .................... 176/30, 87; 414/146; 294/86 A; 307/147; 248/603, 610; 174/42, 43

[56] References Cited

U.S. PATENT DOCUMENTS 4,064,000 12/1977 Andrea ................................ 176/30

Primary Examiner—Donald P. Walsh
Attorney, Agent, or Firm—Kerkam, Stowell, Kondracki & Clarke

[57] ABSTRACT

Tubes or cables designated as ducts and extending through a movable component which is capable of rotational motion about a vertical axis are supported between a fixed point located externally of the movable component and a second point which is located on the vertical axis of rotation of the component and constitutes the extremity of the supporting means. The portions of ducts located between the extremity of the supporting means and the center of rotation of the movable component are guided and maintained in uniformly spaced relation on a ruled surface of revolution about the axis of said movable component so that the duct portions thus form a bundle-type assembly. Means are further provided for securing the lower extremity of the guiding means to the movable component at the center of rotation of this latter.

16 Claims, 10 Drawing Figures

DEVICE FOR GUIDING DUCTS WHICH EXTEND THROUGH A ROTATABLE COMPONENT

This invention relates to a device for guiding ducts assigned to a rotatable component.

It is known that, in certain types of liquid-metal cooled fast nuclear reactors, the reactor vessel containing the core, the liquid metal coolant (usually consisting of sodium) as well as the primary pumps and primary heat exchangers in the integrated type is closed at the top by a concrete slab or shield roof. For operations involving loading and unloading of fuel assemblies constituting the reactor core, the shield roof is in fact fitted with a large rotating shield plug whose axis coincides with the axis of the reactor vessel and the axis of the reactor core, and a small shield plug rotatably mounted with respect to the large rotating plug about an axis which is displaced off-center with respect to the axis of said large rotating plug. Moreover, a so-called "core lid" structure is suspended beneath the small rotating shield plug in the immediate vicinity of the top face of the reactor core.

Moreover, in order to check the correct operation of a fast reactor, it is known that provision is made for a very large number of measuring, control or monitoring instruments placed within the reactor core lid. These instruments consist of temperature and pressure sensors, instruments for measuring neutron flux, instruments for detection and location of can failures and so forth. As will readily be apparent, the complete assembly consisting of such sensors and instruments is connected to electric conductors for supplying current to these devices and for transmitting the data recorded by these latter. In addition, provision must also be made for tubes which supply these different devices with liquids or fluids of various types. In other words, a large number of these sheathed conductor cables or tubes must be assigned to the small rotating shield plug. This is the meaning which must be given to the term "duct" which will be employed in the following description and in the appended claims and which includes both cables and tubes.

The problem which arises is clearly that of guiding said tubes between the small rotating shield plug and the recording or supply devices which are placed outside the reactor vessel but are therefore rigidly fixed to the stationary portion of the shield roof. In other words, the problem to be solved lies in the need to guide said cables and tubes which start from a fixed point and must arrive at one point of the small rotating shield plug. In point of fact, this small plug is rotatable with respect to the large plug which is in turn rotatable with respect to the shield roof. This problem is clearly made even more complex by the very large number of ducts involved (tubes or electric conductors) which result in a not-negligible degree of stiffness of the complete assembly. It is clearly necessary to guide these ducts while making it possible, without any attendant risk of damage, to subject them to the very large number of operations both of the small and large rotating shield plugs during refuelling operations.

In the techniques of the prior art, supply of electric current and of fluid to devices attached to the small rotating shield plug was carried out by making use of a flexible cable connection. The systems employed consisted of circular hoods located above the rotating shield plugs and having approximately the same diameter as these latter. The cables or tubes were first connected to a stationary junction of the hood so as to form a large loop within the interior of this latter, then passed through a movable junction or a stationary junction connected to a movable portion of the hood. The cables extended vertically to connectors which were rigidly fixed to the small rotating plug. The loop provided the necessary slack to ensure that the movable junction was capable of following the combination of displacements of the small and large rotating plugs, thus maintaining the downwardly extending portion of the cables or supply tubes in a vertical position.

The disadvantage of this solution lies in the fact that it is highly cumbersome and takes up a large volume above the seal plugs. This is a major drawback since the small and large rotating shield plugs are already obstructed by a large number of devices related to the operation of the nuclear reactor and replacement of a duct is consequently a matter of considerable difficulty.

However, the field of application of the present invention is not limited in any sense to a nuclear reactor provided with two eccentric rotating shield plugs. The invention is generally applicable to the penetration of a bundle of cables through a rotating component, the other end of the cables being stationarily fixed with respect to the rotating component.

In its application to fast reactors, this invention relates to a device which serves to guide cables and tubes assigned to the small rotating shield plug and makes it possible to free almost entirely the internal space located above the small and large rotating shield plugs. In all of its embodiments, the invention relates to a device which makes it possible to carry out tens of thousands of helical rotations of cables and tubes without producing any failure at angles of rotation of the rotating component of plus or minus 220° with respect to the rest position.

In order to obtain this result, the invention consists of a device for guiding ducts designed to pass through a movable component which is capable of rotational motion about a vertical axis. Said device essentially comprises means for supporting said ducts between a fixed point located externally of said component and a second point located on a vertical axis which coincides with the axis of rotation of said movable component and constitutes the extremity of the supporting means. The device further comprises means for guiding those portions of ducts which are placed between the extremity of said supporting means and the center of rotation of said movable component. Said guiding means are adapted to maintain said portions of ducts in uniformly spaced relation on a ruled surface of revolution about the axis of said movable component so that said portions of ducts thus form a bundle-type assembly. Means are further provided for securing the lower extremity of said guiding means to said movable component at the center of rotation thereof.

As already mentioned, the invention is applicable in particular to nuclear reactors of the double rotating shield plug type. The stationary component in that case is the small rotating shield plug.

Preferably, the means for supporting the cables or ducts consist of two articulated horizontal arms.

In a first embodiment, the device essentially comprises a hanger rigidly fixed to said small shield plug and comprising a vertical column and a horizontal arm, the free extremity of said hanger arm being located on the axis of said small rotating shield plug. The device further comprises a first horizontal guiding arm articulated at one end with respect to a fixed point of the reactor, and an second horizontal guiding arm having one extremity which is pivotally attached to the free extremity of said first guiding arm. Means are provided for controlling the pivotal motion of the first arm with respect to the fixed point and the pivotal motion of the two guiding arms with respect to each other in such a manner as to ensure that the free extremity of said second guiding arm is caused to remain in the axis of said small rotating shield plug. The ducts aforesaid are fixed along said two guiding arms and along the horizontal arm of the hanger. Means are also provided for guiding portions of said ducts which are located between said hanger arm and said second guiding arm so as to maintain said portions of ducts in uniformly spaced relation on a ruled surface of revolution about the axis of said small rotating shield plug so that said portions of ducts thus form a bundle-type assembly.

Preferably, the guiding means aforesaid consist of a plurality of circular plates forming a bottom guide-plate rigidly fixed to the extremity of the hanger arm, a top guide-plate rotationally coupled to the free extremity of the second guiding arm but capable of free vertical translational motion with respect to this latter, and at least one intermediate guide-plate. The portions of ducts aforesaid are fixed at uniform intervals on the periphery of said guide-plates. Means are provided for maintaining said guide-plates horizontal and centered on the axis of said small rotating shield plug. Provision is also made for means whereby the angle of rotation of the top guide-plate with respect to the bottom guide-plate at the time of pivotal motion of the guiding arms and of the rotating shield plugs is uniformly distributed between the guide-plates as a function of the vertical distances between said guide-plates, a degree of slack being left in the ducts between the top guide-plate and the second guiding arm.

According to another distinctive feature, said top guide-plate is rigidly fixed to the extremity of the second guiding arm by means of a variable-length unit which exerts a constant force directed along the axis of said small rotating shield plug and provides a rotational coupling.

Preferably, said unit is a jack having an operating rod disposed along the axis of said small rotating shield plug and rigidly fixed to said top guide-plate, the jack body being rigidly fixed to the extremity of said second guiding arm.

According to another preferred distinctive feature, the guide-plates aforesaid are connected to each other by a plurality of cables having the same length, each cable being attached at the upper end thereof to the top guide-plate and at the lower end thereof to the bottom guide-plate, said cables being so arranged as to pass through the intermediate plates aforesaid and being fixed on these latter.

In an improved embodiment, the hanger aforesaid is in turn capable of rotational motion about the vertical axis of its column by means of an actuating device.

In this case, the device according to the invention is distinguished by the fact that said column is stationary and that said hanger arm is pivotally mounted at the upper extremity of said column, the portions of ducts which extend along said column being attached to the periphery of the second circular guide-plates which are similar to the first guide-plates, said second top guide-plate being rigidly fixed to said arm by means of resilient devices which produce a force in the vertical direction, a degree of slack being left in the ducts between said second top guide-plate and said hanger arm generating a vertically-directed force, with some slackness in the ducts between said second upper plate and said beam. In a first alternative embodiment, the hanger is dispensed with or, in other words, the bottom guide-plate is directly fixed on the small rotating shield plug and the center of the guide-plate corresponds to the axis of rotation of the small shield plug.

In a second alternative embodiment, the guiding means consist of a vertical guiding mast rigidly fixed at the lower end to the center of the small rotating shield plug and at the upper end to the free extremity of the supporting means; a horizontal top guide-plate rotationally coupled to the free extremity of said supporting means but capable of free vertical translational motion and surrounding said mast; a horizontal bottom guide-plate surrounding said mast and rigidly fixed to the lower end of said mast; and at least one intermediate guide-plate surrounding said mast and capable of free translational motion in the direction of said mast, said intermediate guide-plate being partially free for rotational motion about said mast. Each guide-plate is provided at the periphery with uniformly spaced means for fixing the cables aforesaid. The intermediate guide-plate or each intermediate guide-plate is provided with means for limiting rotational displacement about the mast so as to ensure that the angle of rotation between the top guide-plate and the bottom guide-plate is uniformly distributed between the intermediate guide-plate or plates.

A better understanding of the invention will in any case be gained from the following description of a number of embodiments of the invention which are given by way of example but not in any limiting sense, reference being made to the accompanying drawings, wherein.

Figure 1:
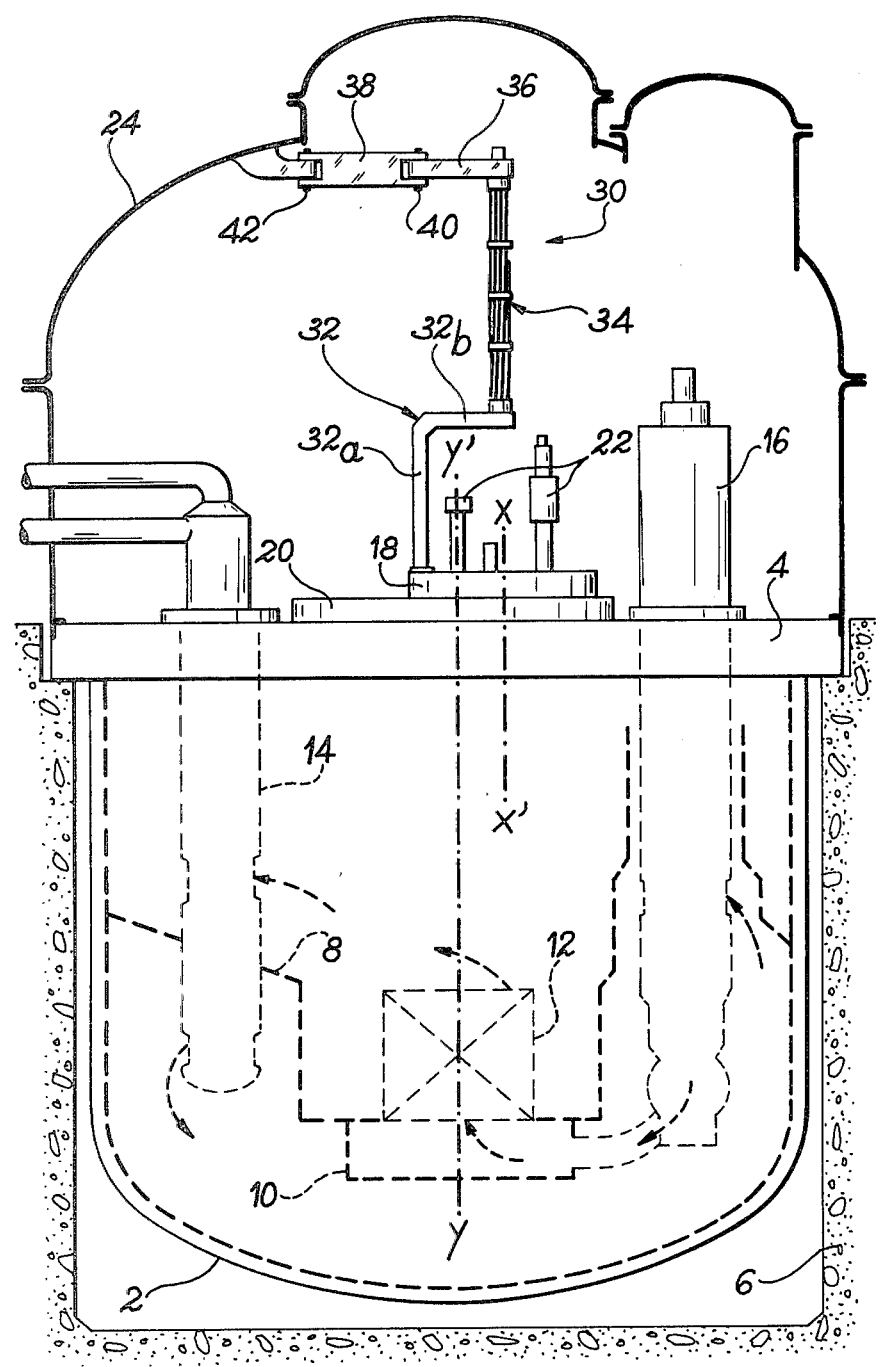
FIG. 1 is a vertical sectional view of a fast reactor equipped with the device for guiding ducts according to the first embodiment of the invention.

In FIG. 1, there is shown the main vessel of an integrated-type fast nuclear reactor 2 suspended from a shield roof 4, said roof being in turn supported by a massive concrete structure 6. Within the interior of the main reactor vessel 2 are placed the primary vessel 8 and the diagrid 10 which supports the reactor core 12 and serves to supply this latter with liquid metal coolant. Since reference is made to a reactor of the integrated type in the example under consideration, there is also shown a primary heat exchanger 14 suspended from the shield roof 4 and a primary pump 16 which is also suspended from said roof. Provision is made within the top shield roof 4 for the small rotating shield plug 18 which is rotatable about the axis X—X' and is in turn mounted within the large rotating shield plug 20. Said large plug is capable of rotating about its axis Y—Y' which coincides with the axis of the main reactor vessel 2. It is thus apparent that any point located in fixed relation to the small rotating shield plug 18 is endowed with planetary motion with respect to the stationary shield roof 4 by a combination of movements of rotation of the small shield plug 18 and of the large shield plug 20. Various devices 22 such as the handling grab and a number of other installations have also been shown diagrammatically on the small rotating shield plug 18. There are also shown the top containment casing 24 which surrounds the space above the shield roof 4.

The whole of the foregoing description can relate to any fast reactor of the integrated type such as the French Superphenix reactor, for example.

In this general figure, there is also shown very diagrammatically the device 30 for guiding tubes and cables which are intended to penetrate through the small rotating shield plug to the reactor core lid according to a first embodiment. Said mechanism 30 comprises a hanger 32 constituted by a vertical portion of column 32a and by a horizontal portion or arm 32b, said hanger 32 being fixed on the periphery of the small rotating shield plug. The hanger 32 is constructed in such a manner that the extremity of the horizontal arm 32b of the hanger 32 is disposed on the axis X—X' of rotation of the small shield plug 18. From the extremity of the horizontal portion 32b of the hanger 32, there extends upwards a vertical central portion forming a bundle-type assembly 34 which is so arranged that its vertical axis coincides with the axis of rotation X—X' of the small shield plug. The device 30 further comprises the following components disposed substantially in the same horizontal plane: a first lever-arm 36 pivotally coupled to the upper extremity of the bundle-type assembly 34 and a second lever-arm 38 pivotally mounted on a pin 40 having a vertical axis with respect to the first arm 36 and with respect to a second vertical pivot-pin 42 which is rigidly fixed to the containment casing 24 of the nuclear reactor.

The length of the vertical portion 32a of the hanger 32 is such that a height H is left free above the small rotating shield plug, thus making it possible to position a number of different devices 22. The cables and tubes which are intended to pass through the small rotating shield plug are fixed respectively on the two guiding arms 36 and 38, extend vertically downwards so as to constitute the bundle-type assembly 34 and are guided by the two elements of the hanger 32 to the different points of the small rotating shield plug 18 at which said cables or tubes are intended to penetrate through this latter.

Figure 2:
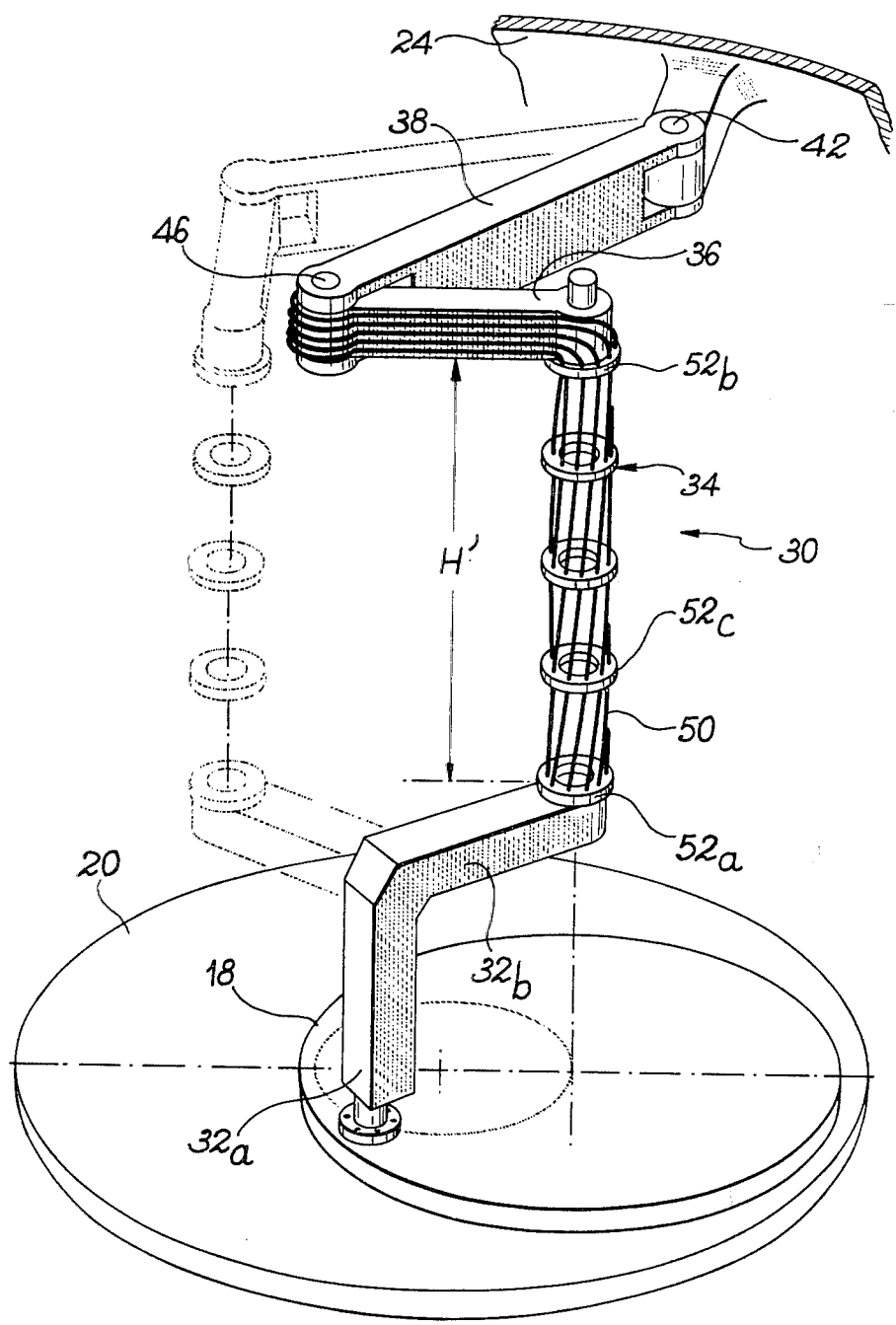
FIG. 2 is a perspective view showing the complete device for guiding tubes and cables above the two rotating shield plugs.
Figure 3:
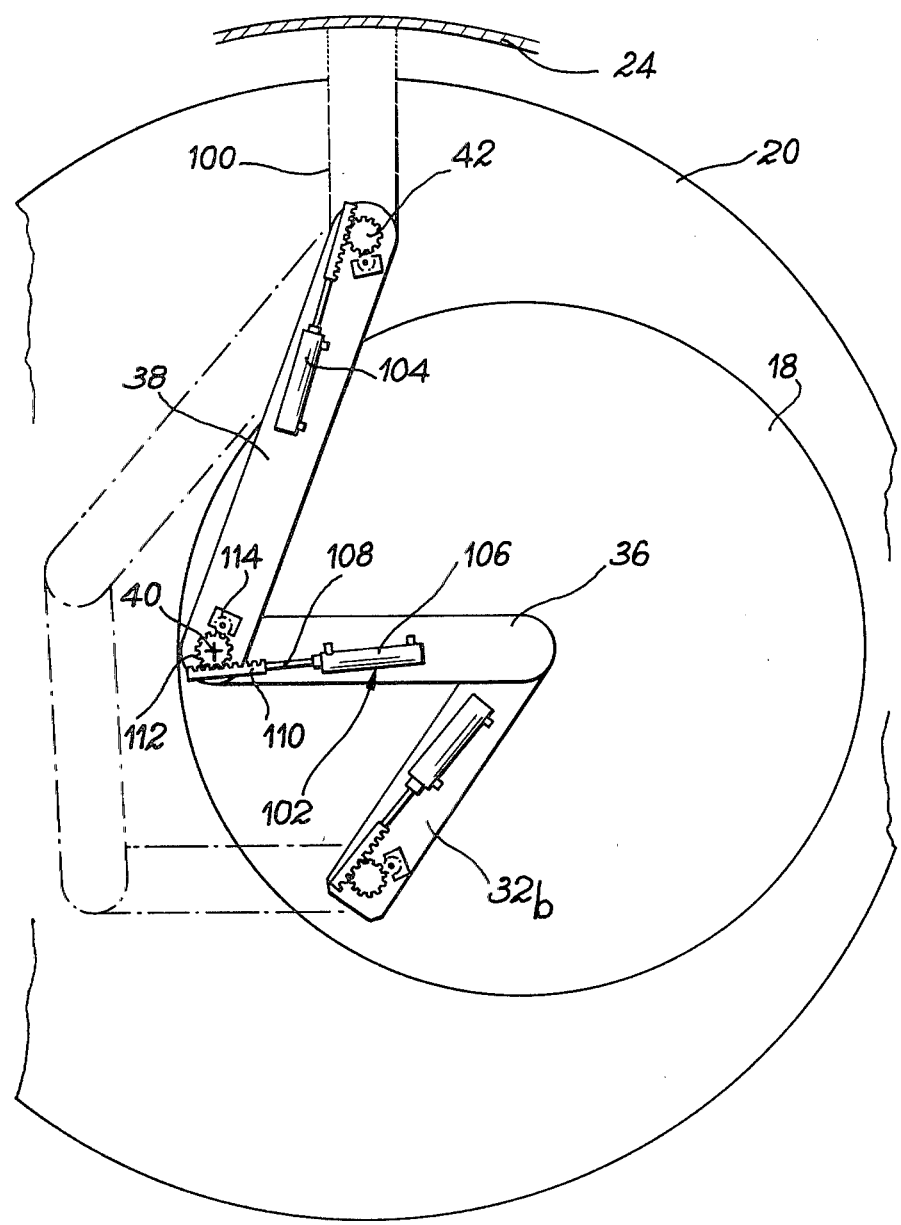
FIG. 3 is a simplified top view of the complete device showing the motors for actuating the guiding arms of the device.

Before proceeding to a more detailed description of the guiding device according to the first embodiment, the advantage and the general operation of the device may already be understood by referring more particularly to FIGS. 2 and 3. During the combined movement of rotation of the small shield plug 18 and of the large shield plug 20, the two lever-arms 36 and 38 are caused to pivot about pins 46 and 42 in such a manner that the vertical axis of the bundle-type assembly 34 remains in coincident relation with the axis of rotation of the small shield plug. It is understood in particular that, by virtue of the presence of these two lever-arms, irrespective of the position of the small rotating shield plug with respect to the large shield plug and more specifically irrespectively of the position of the point at which the hanger 32 is fixed on the small shield plug, the extremity of the lever-arm 36 can be maintained in the line of extension of the axis X—X' of the small shield plug by pivotal displacement of the lever-arms 36 and 38 with relative angles of pivotal motion which are of small amplitude irrespective of the movements of rotation of the small and large shield plugs with respect to a reference position. It can be understood that this limitation of angular displacements is a particularly important feature of the invention since cables or tubes which have a certain degree of stiffness must pass around the different articulations. As will be explained hereinafter, this makes it possible in particular to limit the dead length of cables and tubes while also limiting the value of stress induced in the tubes or cables under the action of the twisting effort produced by rotational displacement of the small and large shield plugs.

It is readily apparent that one of the problems to be solved is that of twisting of the cables or tubes in the vertical guiding portion corresponding to the bundle-type assembly 34. In more precise terms, the problem is to control the degree of twist in order to prevent introduction of excessive localized stresses in said tubes or cables since the repetitive character of such stresses would be liable to result in damage.

The construction of this portion of the device will now be described in greater detail in order to provide a clearer idea of its originality.

For the purpose of guiding in the vertical direction in the bundle-type assembly 34, the different cables or tubes 50 are fixed on annular guide-plates such as the plate 52 and these latter are uniformly spaced between the horizontal portion 32b of the hanger 32 and the arm 36. In fact, a distinction must be drawn between a bottom guide-plate 52a which is rigidly fixed to the arm 32b of the hanger 32, a top guide-plate 52b which is associated with the arm 36 and intermediate guide-plates 52c. At least in the portion corresponding to the bundle-type assembly 34, the cables or tubes 50 are fixed on the guide-plates 52 in uniformly spaced relation and thus constitute the equivalent of a squirrel cage. As will become apparent hereinafter, the different guide-plates are positioned relative to each other by means of three cables secured to the bottom ring 52a and to the top ring 52b. It is further apparent that twisting of the cables 50 is produced at the time of rotation of the upper arms 36 and 38. This twisting movement in one direction or in the other is clearly accompanied by a reduction in the vertical height H' between the bottom guide-plate 52a which is rigidly fixed to the arm 32b and the top guide-plate 52b with respect to an intermediate value. As will be explained in detail below, the guide-plate 52b is consequently not directly secured to the arm 36 but is coupled to this latter through the intermediary of a vertical jack which permits displacements of the top guide-plates 52b in order to absorb the reductions or increases in said height H' with respect to an intermediate value.

Figure 4:
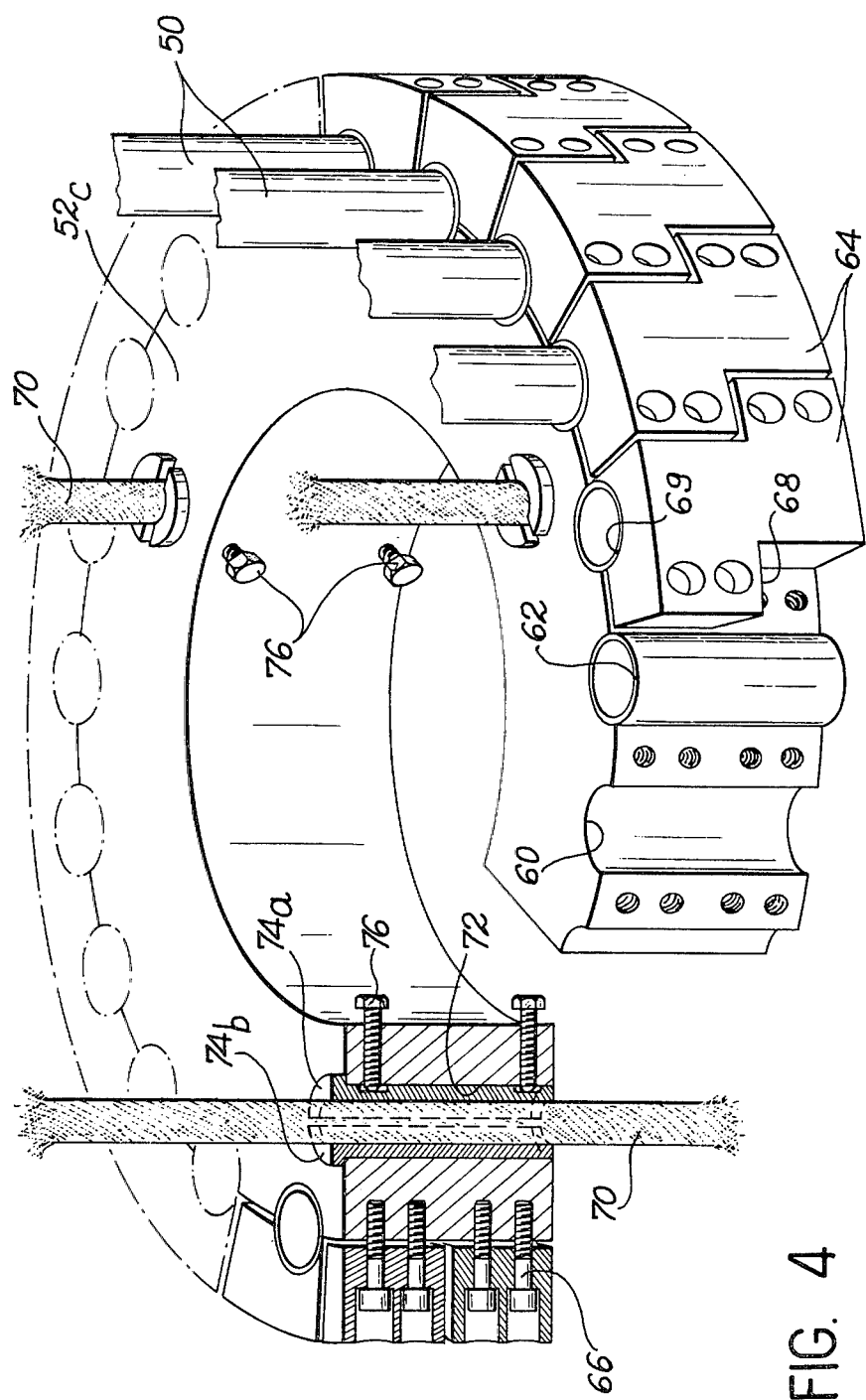
FIG. 4 is a perspective view of one guide-plate of the vertical portion of the device according to the first embodiment.

In FIG. 4, there is shown in greater detail one example of construction of an intermediate guide-plate 52c. This latter is designed in the form of a ring, the external face of which is provided with semicylindrical recesses 60. The cables such as the cable 50 are placed at the level of the guide-plate within a circular sleeve 62. Said sleeve is in turn placed within a recess 60 and clamped in position by means of an individual clamping member such as the member 64. Said clamping member 64 is fixed in the guide-plate 52 by means of four screws such as the screw 66. It is apparent that the imbricated shape 68 of said clamping members makes it possible to reduce the space between two consecutive cables 50 while fixing the clamping member 64 in position on each side of the sleeve 62. As can readily be understood, each clamping member has a semi-cylindrical bore 69 which cooperates with the bore 60 of the intermediate guide-plate 52c. It is further apparent that exactly the same method is adopted for fixing the cables or tubes 50 in the guide-plates 52a and 52b.

Furthermore and as mentioned earlier, the different intermediate guide-plates 52c are maintained in position by means of supporting cables 70. By way of example, provision is made for three supporting cables. As will be explained hereinafter, said cables are fixed on the top guide-plate 52a and on the bottom guide-plate 52b and are, of course, also fixed within the intermediate guide-plates 52c. In FIG. 4, there is also shown a preferred mode of clamping of the cables 70. This clamping operation is carried out by placing two semi-cylindrical half-shells 74a and 74b within a bore 72 formed in the guide-plate 52. Clamping of the cable within the guide-plate 52 is carried out, for example, by means of two cone-point set-screws 76 which are intended to clamp one of the half-shells in position (namely the half-shell 74a, for example) with respect to the upper half-shell. It is apparent that the cables 70 are then secured to each intermediate guide-plate.

It is important to lay emphasis on the double function performed by the supporting cables 70. The first function is to maintain equality of spacing between two consecutive guide-plates during relative movement of the arm 36 with respect to the hanger 32 in the vertical direction. The other function is to ensure uniform distribution between the different intermediate guide-plates 52c of the angle through which the top guide-plate 52b rotates with respect to the bottom guide-plate 52a which is rigidly fixed to the hanger. It may be stated in more precise terms that, by virtue of the supporting cables 70, if the top guide-plate 52b rotates through an angle A with respect to the bottom guide-plate 52a, the angle between two consecutive guide-plates will be substantially equal to $A/(n+1)$ if there are n intermediate guide-plates 52c.

It should be added that the second function could be performed in a different way. For example, provision could be made in the case of each guide-plate for two stops which are rigidly fixed to the guide-plate located immediately beneath and limit the movement of rotation of the guide-plate considered to a maximum angle, taking into account the maximum angle which can appear between the bottom guide-plate 52a and the top guide-plate 52b.

In more general terms, the guide-plates are connected to each other in such a manner as to ensure that the total angle of rotation between the top guide-plate and the bottom guide-plate is distributed between the different guide-plates in proportion to the distance between the plates in the vertical direction and that they retain a common axis of symmetry of revolution.

Figure 5:
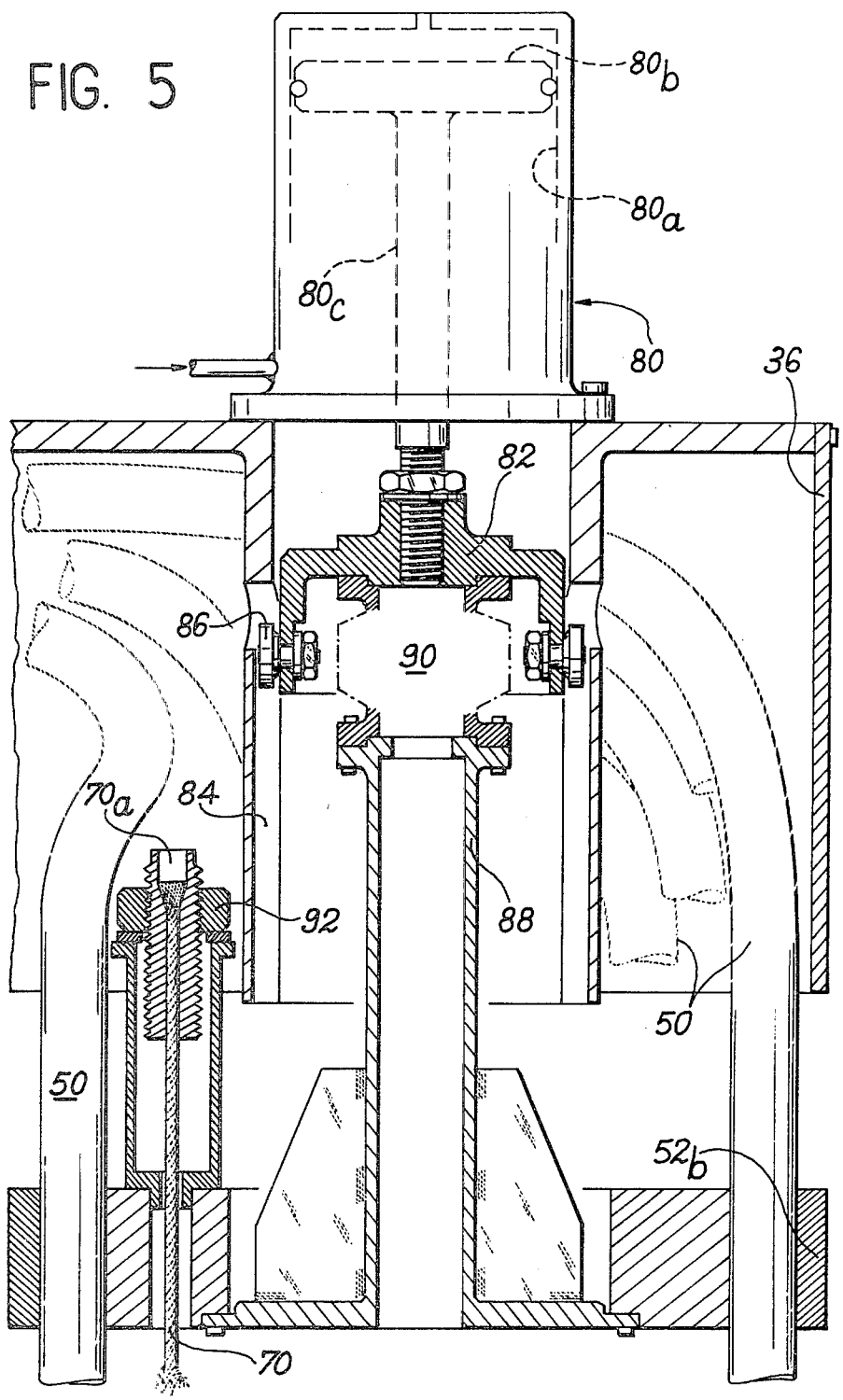
FIG. 5 is a sectional view in elevation showing the upper end of the vertical portion of the device according to the first embodiment.

In FIG. 5, there is shown the articulation between the bundle unit 34 and the arm 36, and more precisely the mode of compensation for variations in length resulting from twisting of the cables or tubes 50. The top guide-plate 52b is not rigidly fixed to the arm 36 but coupled to this latter by means of the operating rod of a jack designated by the general reference 80.

The jack body is designated by the reference 80a, the jack piston is designated by the reference 80b and the operating rod of the jack is designated by the reference 80c. Said operating rod is rigidly fixed to a yoke 82 which is guided in vertical translational motion as a result of cooperation of guides 84 and rollers 86 attached to the yoke 82 which is rigidly fixed to a transmission rod 88. Said rod is fixed on the one hand on the top guide-plate 52b and on the other hand on the yoke 82 by means of a system 90 forming a universal-joint assembly. It is thus apparent that the top guide-plate 52b is in fact rotationally coupled to the arm 36 but capable of displacement in a vertical direction with respect to the arm 36. More specifically, the jack 80 is controlled in such a manner as to exert a constant force. Thus, under the action of rotation of the top guide-plate 52b with respect to the bottom guide-plate 52a, displacement of the guide-plate 52b takes place progressively only during the course of twisting of all the cables 50. Moreover, FIG. 5 shows diagrammatically the upper extremity 70a of the suspension cable 70 associated with a nut system 92 which makes it possible to carry out the adjustment.

FIG. 3 is a top view showing diagrammatically the complete device for guiding cables or tubes. There are again shown the horizontal arm 32b of the hanger 32, the arm 36 which is pivotally mounted with respect to said hanger, the arm 38 which is pivoted about the pin 40 with respect to the arm 36, the arm 38 being in turn pivoted about the pin 42 with respect to a support bracket 100 which is rigidly fixed to the dome 24. The movements of the arms 36 and 38 in order to follow the movements of the small and large rotating shield plugs are produced by two actuating devices designated by the reference 102 for the movement of the arm 36 with respect to the arm 38 about the pivot-pin 40 and by the reference 104 for the movement of the arm 38 about the pivot-pin 42 with respect to the fixed support bracket 100.

In the embodiment shown in FIG. 3, each actuating means 102 or 104 consists of a hydraulic jack 106 which is rigidly fixed to the arm 36, for example, and the operating rod 108 of which is adapted to carry a toothed rack 110. Said toothed rack is disposed in meshing engagement with a toothed pinion 112 which is rigidly fixed to the arm 38 and the shaft of which is coaxial with the pivot-pin 40. It can readily be understood that, by initiating operation of the jack 106, the arm 36 is displaced in pivotal motion with respect to the arm 38. Furthermore, the device comprises a mechanical detector as designated for example by the reference 114 for detecting any movement of the arm 36 with respect to the arm 38. A signal which is representative of said movement is transmitted by said detector to the control unit. Exactly the same principle of operation applies to the actuating device 104. In this embodiment, it is apparent that the control unit includes follow-up control devices for causing the actuating devices 102 and 104 to displace the extremity of the arm 36 in such a manner as to ensure that said extremity remains vertically above the center of the small rotating shield plug. It will naturally be understood that other actuating means could be employed. This result can readily be obtained in accordance with well-known control techniques involving the use of detectors 114, for example, and achieving follow-up control between said mechanical means 104 and 102 and the mechanical means for producing displacements of the small and large rotating shield plugs. It is therefore unnecessary to describe this follow-up control system in greater detail.

In the foregoing description, it has been considered that the hanger 32 was rigidly fixed on the small rotating shield plug or in other words that there did not exist any possibility of pivotal displacement of the vertical portion 32a with respect to the small rotating shield plug. However, for certain handling operations in the nuclear reactor, it may prove advantageous to provide maximum clearance within the entire space which extends above the small rotating shield plug. It is for this reason that, in accordance with an improved alternative embodiment, provision can be made for a possibility of pivotal displacement of the hanger about its vertical axis Z—Z'.

Figure 6:
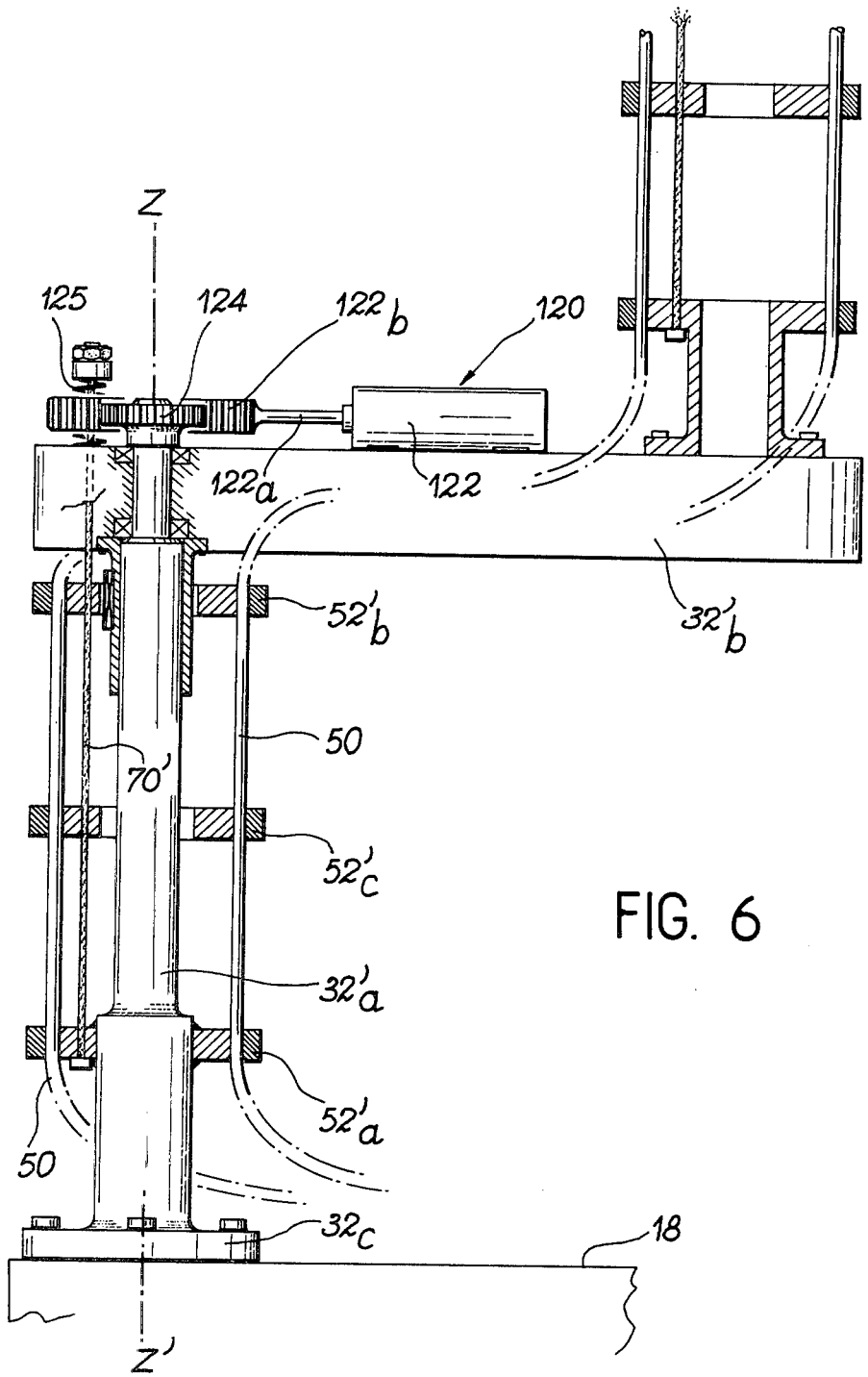
FIG. 6 is a vertical sectional view showing the hanger of an alternative embodiment in which the hanger is capable of moving with respect to the small rotating shield plug.

This form of construction will now be described in greater detail with reference to FIG. 6.

In this embodiment, the horizontal arm 32'b is capable of rotating in a horizontal plane about the vertical column 32'a. It is apparent that, under these conditions, the same problem arises in regard to twisting of the cables or tubes 50 which are placed along this portion of the guiding device. This problem is solved substantially in the same manner as in the case of the bundle portion 34. It should nevertheless be borne in mind that rotational displacement of the hanger takes place at much less frequent intervals than the bundle portion 34 and that the applied forces are also of much lower value.

The vertical column 32'a is provided with a base 32c which is rigidly fixed to the small rotating shield plug 18. The arm 32'b of the hanger is pivotally mounted on the upper extremity of the vertical column 32'a in known manner. Guiding of the cables or tubes 50 is carried out by means of annular plates which are similar to the plates 52. There is thus shown a bottom annular guide-plate 52'a which is rigidly fixed to the base 32c, a top annular guide-plate 52'b which is rigidly fixed to the arm 32'b and one or a number of intermediate annular plates 52'c, said intermediate annular plate or plates being capable of moving freely in translational motion and in rotational motion with respect to the vertical column 32'a.

The cables or tubes 50 are fixed at uniform intervals on the periphery of the guide-plates so as to form the equivalent of a squirrel cage. As in the case of the bundle portion 34, the intermediate annular plate or plates are connected to the top plate 52'b by means of supporting cables 70'. Said cables 70' are fixed on the top guide-plate 52'b by means of resilient devices 125 which perform much the same function as the jack 80 while taking into account that the movements take place at a much lower frequency.

Moreover, the vertical column 32'a passes through the horizontal arm 32'b. An actuating device 120 makes it possible to cause rotational displacement of the arm 32'b about the vertical column 32'a. Said actuating device can consist of a jack 122, the operating 122a of which is rigidly fixed to a toothed rack 122b in cooperating relation with a pinion 124 which is rigidly fixed to the upper extremity of the vertical column 32'a.

The actuating device is associated with a sensor for detecting rotational motion of the arm 32'b (not shown). It is readily apparent that, when inititiating a movement of rotation of the vertical column 32'a, it is also necessary to initiate the corresponding movements of rotation of the arms 36 and 38. This function is performed by the general control unit of the device. It would not constitute any departure from the invention if the vertical column 32'a were rotatable with respect to the base 32c which is rigidly fixed to the small rotating shield plug 18, in which case the arm 32'b would be rigidly fixed to the vertical column 32'a. It can readily be understood in this case that the actuating device 120 is rigidly fixed to the small rotating shield plug and transmits its movement to the foot of the vertical column 32'a.

It should be added that, taking into account the weight of the assembly constituted by the two guiding arms 36 and 38 and by the cables and tubes 50 which are secured to said arms, it may be preferable to support the arms 36 and 38. Provision can accordingly be made for a cable which is attached at its lower end to the pivot-pin 40 of the arm 38 and is secured at its upper end to a slide-block, said slide-block being capable of moving within a circular guide rail which is rigidly fixed to the dome 24.

It can be mentioned by way of example that, by virtue of the two supporting arms 36 and 38, the maximum movements of rotation of the large shield plug are followed with maximum angles of pivotal displacement at the level of the articulations or pivot-pins 40 and 42, these angles being equal respectively to 45° and 62°. It is apparent that the reduced value of these angles considerably simplifies the problem of the flexibility loops or "slack" which the cables and tubes must possess at the level of said articulations.

It is understood that, by means of the device according to the invention, the space which extends above the small and large rotating shield plugs can be freed to the maximum extent in order to facilitate positioning of the different mechanisms on the shield plugs. Furthermore, the guiding means make it possible to limit the degrees of curvature or of twist applied to the cables or tubes during the different movements, thus considerably reducing the stresses applied to said cables or tubes and increasing the useful life of these latter. The device further permits accessibility of the cables, with the result that these latter are conveniently interchangeable.

In the foregoing description, the bottom guide-plate 52a is rigidly fixed to the hanger 32 in order to provide maximum clearance for the small rotating shield plug. However, in some cases or in other applications of the device, it would be possible to dispense with the hanger. The bottom guide-plate 52a would then be directly fixed on the small shield plug 18 at its center of rotation. The system would then be simplified in the case of the first alternative embodiment.

In the second alternative embodiment of the invention which will now be described, the hanger is in fact dispensed with. The bundle-type assembly described earlier is replaced in this case by a "rigid axis" assembly which provides a direct connection between the center of rotation of the small rotating shield plug and the free end of the horizontal articulated arm. Moreover, the general problem to be solved is again the same since it remains necessary to avoid twisting of the cables or ducts.

Figure 7A:
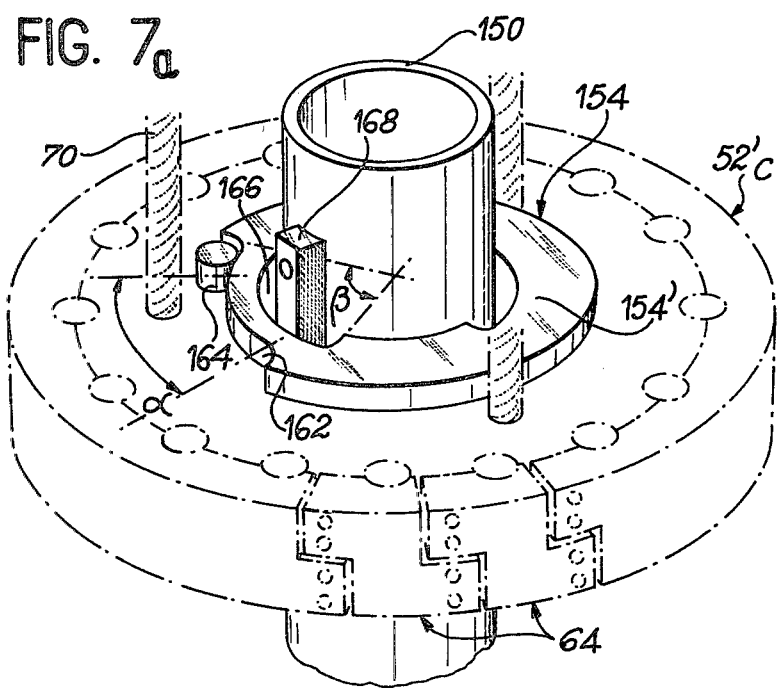
FIGS. 7a and 7b are views in perspective and in vertical cross-section showing a first form of construction of an intermediate guide-plate according to the second alternative embodiment.
Figure 7B:
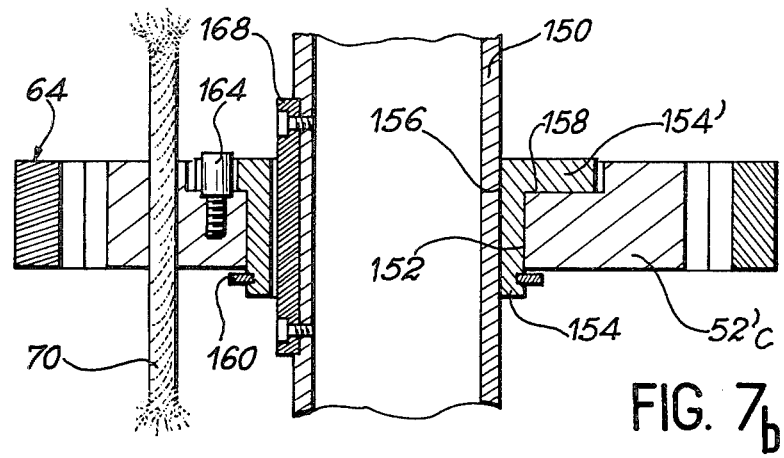
Figure 9:
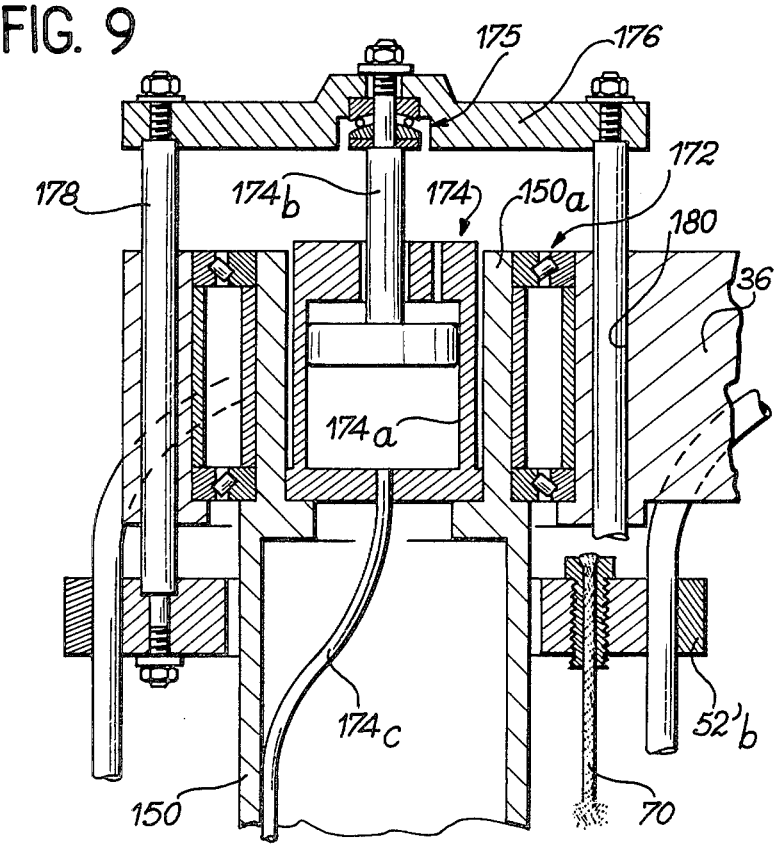
FIG. 9 is a vertical part-sectional view of the upper portion of the mast showing the connection between the top guide-plate and the mast.

The central portion of the rigid vertical mast 150 is shown in FIGS. 7a and 7b and the upper end of said mast is shown in FIG. 9. It is recalled that the lower end of the mast is rigidly fixed at the center of the small rotating shield plug 18 and that the axis of the mast coincides with the axis of rotation of the plug.

FIGS. 7a and 7b show one form of construction of the intermediate guide-plates 52'c. The external periphery of the guide-plate 52' is identical with the external periphery of the intermediate guide-plates 52c and therefore does not call for any further description. Similarly, horizontality of the guide-plates is achieved by means of cables 70 as in the previous embodiments. The difference lies in the cooperation between the intermediate guide-plate and the mast 150; this cooperation permits equal distribution of the total rotation between the intermediate guide-plates.

The guide-plate 52'c is pierced by a central bore 152. Within the interior of said bore 152 and around the mast 150, provision is made for a ring 154 in which is formed a central bore 156. The ring 154 is coupled for translational motion with the guide-plate 52'c on the one hand by means of its flat portion 154' which penetrates into the recessed portion 158 of the guide-plate 52'c and on the other hand by means of circlips 160. However, the ring 154 is capable of rotating with respect to the guide-plate. The flat portion 154' of the ring is provided at its external periphery with at least one recess 162 corresponding to an angle α at the center. Said recess 162 is adapted to cooperate with a stud 164 which is rigidly fixed to the guide-plate. Provision could naturally be made for a plurality of recesses 162 and for a plurality of studs 164.

The internal face of the ring 154 corresponding to the bore 156 is also provided with a recess 166 corresponding to an angle at the center equal to β. This second recess 166 is adapted to cooperate with a key 168 fixed on the mast by any known means. It will readily be apparent that provision can be made for a plurality of recesses 166 and for a plurality of keys 168 in order to accommodate applied stresses. It is therefore apparent that two assemblies are provided for limiting the angle of rotation of the guide-plate 52c with respect to the mast 150, the effects of which are added. The total possible range of angular displacement has the value α+β.

Figure 8:
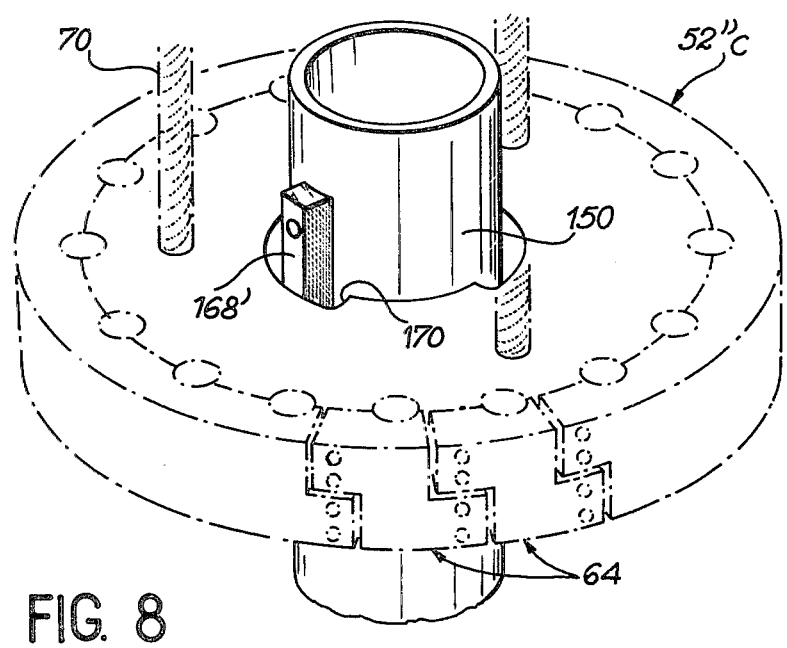
FIG. 8 is a perspective view showing a second simplified form of construction of an intermediate guide-plate according to the second alternative embodiment.

In FIG. 8, there is shown a simplified form of construction of the guide-plate 52"c. Provision is made simply for a key 168' which is rigidly fixed to the mast 150 and for a recess 170 formed in the internal face of the guide-plate 152"c. There is thus obtained only one possibility of rotation equal to β.

The top guide-plate 52'b is shown in FIG. 9. As already explained with reference to FIG. 5, the guide-plate 52'b must be capable of displacement in the vertical direction under the action of a jack and is rotationally coupled to the extremity of the horizontal arm 36.

The upper extremity 150a of the mast 150 is rotatably mounted in the extremity of the arm 36, for example by means of two ball-type or roller-type thrust bearings. The extremity 150a is fitted internally with the body 174a of a pneumatic jack 174, the operating rod 174b of which is rigidly fixed to a horizontal guide-plate 176 by means of the ball thrust bearing 175. The pipe 174c for supplying the jack 174 is also shown. The guide-plate 176 is connected to the top guide-plate 52'c by means of rods such as the rod 178. Said rods 178 traverse the arm 36 through bores 180. It is therefore apparent that the top guide-plate 52'b is rotationally coupled to the arm 36 but that the top guide-plate 52b is capable of vertical displacement along the mast 150 under the action of the jack 174.

Under the action of a movement of rotation of the mast 150, the ducts or pipes 50 assume a helical configuration and the jack moves downwards. The tensile load does not change since the pneumatic circuit comprises either a large volume of gas or an expansion and overflow system.

As already mentioned, the intermediate guide-plates 52'c or 52"c serve to ensure equal distribution of the total angle of rotation between the bottom guide-plate which is rigidly fixed to the shield plug and the top guide-plate 52'b which is rotationally coupled to the arm.

The intermediate guide-plate 52"c of FIG. 8 permits a maximum rotation β=100° if it is desired to provide three keys 168' and three recesses 170. By means of guide-plates of the type designated by the reference 52"c, it is therefore possible to obtain all values of angular displacement up to ±50°.

The system constituted by the recess 162 and the stud 164 of FIG. 7a permits a maximum angle of rotation α=340°. It is in fact necessary to take into account the diameter of the stud 164 and the length of the heel or projecting portion to be left on the periphery of the ring.

If the guide-plate is intended to have an angular displacement within the range of ±50° to ±170°, it is clearly unnecessary to make use of the angle β. The recess 166 will therefore have a width equal to the width of the key 168. The angle α is zero.

If the guide-plate is intended to have an angular displacement within the range of ±170° to ±220°, the guide-plate 52'c is put to use by employing the two rotation-limiting systems.

By way of example, if five intermediate guide-plates are employed and the total angle of displacement has a value of ±150°, the following intermediate guide-plates can be employed successively:

In the case of the two intermediate guide-plates located nearest the bottom guide-plate, plates of the type designated by the reference 52"c will be employed with respective values in respect of β=0; in the case of α, the respective values will be ±75°, ±100° and ±125°.

There is then obtained an accurate distribution of the helix of the ducts 50 of the bundle over the entire length of the vertical mast 150, especially under the most exacting conditions which correspond to maximum design values of angular displacement which cannot be exceeded.

Contraction of a bundle unit calls for adapted ducts and, as in any system which works in torsion, the ducts 50 will be judiciously arranged so as to ensure that the center of torsion of the bundle unit corresponds as closely as possible to the principal axis of the guide-plates and of the mast.

It should nevertheless be added that the horizontal arms 36 and 38 could be replaced by other means for supporting the cables and ducts between the fixed point and the upper extremity of the main bundle portion 34. It would also be possible to employ conventional flexible connections such as festoons or garlands as employed in known manner for linear displacements of traveling bridge cranes, whether these latter are combined with sliding linear arms or not.

Furthermore, the device according to the invention and in particular the structure of its main bundle portion is applicable to fields other than nuclear reactors equipped with eccentric rotating shield plugs. The fuel assembly storage pools associated with fast reactors can be mentioned by way of example. Ducts arranged in a bundle can also be used to supply fuel assembly storage magazines of the rotary drum or carousel type. Broadly speaking, the invention is applicable whenever a bundle of cables, pipes or ducts having a certain degree of stiffness is intended to pass through a rotating component.

I claim:

1. A device for guiding ducts between a point of a component which is capable of rotational motion about a vertical axis and a fixed point located externally of said component, wherein said device comprises means for supporting the ducts between said fixed point located on the axis of rotation of said movable component and does not rotate with the latter, and means for guiding ducts between the second point and a third point located on the axis of rotation of said movable component and rotating with the latter, said third point being located at a given distance of said second point, said guiding means being adapted to maintain the ducts in uniformly spaced relation on a surface of revolution about the axis of rotation of said movable component whatever the rotation of the third point relative to the second point and to ensure uniform distribution of this rotation on said distance between the second and third point, so that the ducts form a bundle type assembly in said guiding means, said device further comprising means for securing the third point to said movable component.

2. A device according to claim 1, wherein said movable component is the small rotating shield plug of a nuclear reactor of the type which is closed at the top by a horizontal shield roof fitted with a large shield plug which is rotatable about the vertical axis thereof and with a small rotating shield plug arranged within said large rotating shield plug and displaced off-center with respect to said large rotating shield plug.

3. A device according to claim 2, wherein said means for supporting said ducts consist of two articulated arms, one arm being rigidly fixed to the upper extremity of said guiding means and the other arm being rigidly fixed to a stationary portion of said reactor.

4. A device according to claim 2, wherein said device comprises a hanger rigidly fixed to said small shield plug and comprising a vertical column and a horizontal arm, the free extremity of said hanger arm being located on the axis of said small rotating shield plug, a first horizontal guiding arm articulated at one extremity with respect to a fixed point of the reactor, a second horizontal guiding arm having one extremity which is pivotally attached to the free extremity of said first guiding arm, means for controlling the pivotal motion of the first arm with respect to the fixed point and the pivotal motion of the two guiding arms with respect to each other in such a manner as to ensure that the free extremity of said second guiding arm is caused to remain in the axis of said small rotating shield plug, the ducts aforesaid being fixed along said two guiding arms and along the horizontal arm of the hanger, and means for guiding portions of said ducts which are located between said hanger arm and said second guiding arm so as to maintain said portions of ducts in uniformly spaced relation on a ruled surface of revolution about the axis of said small rotating shield plug so that said portions of ducts thus form a bundle-type assembly.

5. A device according to claim 4, wherein the guiding means aforesaid consist of a plurality of circular plates forming a bottom guide-plate rigidly fixed to the extremity of the hanger arm, a top guide-plate rotationally coupled to the free extremity of the second guiding arm but capable of free vertical translational motion with respect to said second arm, and at least one intermediate guide-plate, the portions of ducts aforesaid being fixed at uniform intervals on the periphery of said guide-plates, and means for maintaining said guide-plate horizontal and centered on the axis of said small rotating shield plug, and means whereby the angle of rotation of the top guide-plate with respect to the bottom guide-plate at the time of pivotal motion of the guiding arms and of the rotating shield plugs is uniformly distributed between the guide-plates as a function of the vertical distances between said guide-plates, a degree of slack being left in the ducts between the top guide-plate and the second guiding arm.

6. A device according to claim 5, wherein said top guide-plate is rigidly fixed to the extremity of the second guiding arm by means of a variable-length unit which exerts a constant force directed along the axis of said small rotating shield plug and provides a rotational coupling.

7. A device according to claim 6, wherein the unit aforesaid is a jack having an operating rod disposed along the axis of said small rotating shield plug and rigidly fixed to said top guide-plate, the jack body being rigidly fixed to the extremity of said second guiding arm.

8. A device according to claim 5, wherein the guide-plates aforesaid are connected to each other by a plurality of cables having the same length, each cable being attached at the upper end thereof to the top guide-plate and at the lower end thereof to the bottom guide-plate, said cables being so arranged as to pass through the intermediate guide-plates aforesaid and being fixed on said plates.

9. A device according to claim 4, wherein the hanger aforesaid is in turn capable of rotational motion about the vertical axis of its column by means of an actuating unit.

10. A device according to claim 9, wherein said vertical column is stationary and wherein said hanger arm is pivotally mounted at the upper extremity of said vertical column, the portions of ducts which extend along said column being attached to the periphery of the second circular guide-plates which are similar to the first guide-plates, said second top guide-plate being rigidly fixed to said arm by means of resilient devices which produce a force in the vertical direction, a degree of slack being left in the ducts between said second top guide-plate and said hanger arm.

11. A device according to claim 10, wherein said guiding means consist of a plurality of circular plates forming a bottom guide-plate coupled directly to the small rotating shield plug, a top guide-plate rotationally coupled to the free extremity of the second guiding arm but capable of free vertical translational motion with respect to said second arm, and at least one intermediate guide-plate, the portions of ducts aforesaid being fixed at uniform intervals on the periphery of said guide-plates, and means for maintaining said guide-plates horizontal and centered on the axis of said small rotating shield plug, and means whereby the angle of rotation of the top guide-plate with respect to the bottom guide-plate at the time of pivotal motion of the guiding arms and of the rotating shield plugs is uniformly distributed between the guide-plates as a function of the vertical distances between said guide-plates, a degree of slack being left in the ducts between the top guide-plate and the second guiding arm.

12. A device according to claim 11, wherein said top guide-plate is rigidly fixed to the extremity of the second guiding arm by means of a variable-length unit which exerts a constant force directed along the axis of said small rotating shield plug and provides a rotational coupling.

13. A device according to claim 11 or claim 12, wherein the guide-plates aforesaid are connected to each other by a plurality of cables having the same length, each cable being attached at the upper end thereof to the top guide-plate and at the lower end thereof to the bottom guide-plate, said cables being so arranged as to pass through the intermediate guide-plate or guide-plates aforesaid and being fixed thereon.

14. A device according to claim 2 or claim 3, wherein the guiding means aforesaid consist of a vertical guiding mast rigidly fixed at the lower end to the center of the small rotating shield plug and at the upper end to the free extremity of the supporting means, a horizontal top guide-plate rotationally coupled to the free extremity of said supporting means but capable of free vertical translational motion and increasing said mast, a horizontal bottom guide-plate encircling said mast and rigidly fixed to the lower end of said mast, and at least one intermediate guide-plate encircling said mast and capable of free translational motion in the direction of said mast, said intermediate guide-plate being partially free for rotational motion about said mast, each guide-plate being provided at the periphery with uniformly spaced means for fixing the cables aforesaid, the intermediate guide-plate or each intermediate guide-plate being provided with means for limiting rotational displacement about the mast so as to ensure that the angle of rotation between the top guide-plate and the bottom guide-plate is uniformly distributed between the intermediate guide-plate or plates.

15. A device according to claim 14, wherein the means for limiting said angle of rotation consists of at least one key rigidly fixed to the mast in cooperating relation with at least one recess having the desired length and formed in the periphery of the central orifice of the intermediate guide-plate.

16. A device according to claim 14, wherein the means for limiting said angle of rotation consist of a ring which is coupled for translational motion with said guide-plate and the external periphery of which is provided on the one hand with at least one recess of given length in cooperating relation with at least one stud rigidly fixed to said intermediate guide-plate qnd on the other hand with at least one recess of given length formed on the internal periphery of said ring and adapted to cooperate with a key which is rigidly fixed to said mast.

* * * * *